US009396609B2

(12) United States Patent
Ashley et al.

(10) Patent No.: US 9,396,609 B2
(45) Date of Patent: Jul. 19, 2016

(54) SYSTEM AND METHOD FOR GAMING

(71) Applicant: Aristocrat Technologies Australia Pty Limited, North Ryde, NSW (AU)

(72) Inventors: Simon Patrick Ashley, Faulconbridge (AU); George Roukis, Miranda (AU); Antoon Christiaan Visser, Coogee (AU)

(73) Assignee: ARISTOCRAT TECHNOLOGIES AUSTRALIA PTY LIMITED (AU)

(*) Notice: Subject to any disclaimer, the term of this patent is extended or adjusted under 35 U.S.C. 154(b) by 558 days.

(21) Appl. No.: 13/626,406

(22) Filed: Sep. 25, 2012

(65) Prior Publication Data

US 2013/0023333 A1 Jan. 24, 2013

Related U.S. Application Data

(63) Continuation of application No. 12/367,130, filed on Feb. 6, 2009, now Pat. No. 8,298,068.

(30) Foreign Application Priority Data

Feb. 6, 2008 (AU) ................................ 2008900547

(51) Int. Cl.
*G06F 17/00* (2006.01)
*G06F 19/00* (2011.01)
*G07F 17/32* (2006.01)
*G07F 17/34* (2006.01)

(52) U.S. Cl.
CPC ............ *G07F 17/3258* (2013.01); *G07F 17/32* (2013.01); *G07F 17/3211* (2013.01); *G07F 17/3213* (2013.01); *G07F 17/34* (2013.01)

(58) Field of Classification Search
CPC .......................... G07F 17/3258; G07F 17/3211
See application file for complete search history.

(56) References Cited

U.S. PATENT DOCUMENTS

| | | | | |
|---|---|---|---|---|
| 4,624,459 | A | 11/1986 | Kaufman | |
| 4,652,998 | A | 3/1987 | Koza et al. | |
| 4,837,728 | A | 6/1989 | Barrie et al. | |
| 5,085,436 | A * | 2/1992 | Bennett | G07F 17/3244 273/143 R |
| 5,116,055 | A | 5/1992 | Tracy | |
| 5,318,298 | A | 6/1994 | Kelly et al. | |
| 5,542,669 | A | 8/1996 | Charron et al. | |
| 5,645,486 | A * | 7/1997 | Nagao et al. | 463/27 |
| 6,110,043 | A * | 8/2000 | Olsen | 463/27 |
| 6,113,098 | A * | 9/2000 | Adams | 273/143 R |
| 6,203,429 | B1 * | 3/2001 | Demar et al. | 463/20 |
| 6,224,483 | B1 | 5/2001 | Mayeroff | |
| 6,224,484 | B1 * | 5/2001 | Okuda et al. | 463/27 |
| 6,336,863 | B1 | 1/2002 | Baerlocher | |
| 6,533,273 | B2 * | 3/2003 | Cole | G07F 17/3239 273/138.1 |
| 6,612,574 | B1 * | 9/2003 | Cole et al. | 273/138.1 |
| 6,634,945 | B2 | 10/2003 | Glavich et al. | |

(Continued)

FOREIGN PATENT DOCUMENTS

| | | | |
|---|---|---|---|
| AU | 721968 | | 6/1998 |
| GB | 2384097 | A * | 7/2003 |

*Primary Examiner* — Steven J Hylinski
(74) *Attorney, Agent, or Firm* — McAndrews, Held & Malloy, Ltd.

(57) ABSTRACT

A method of gaming comprises providing a jackpot game in addition to a main game, the jackpot game being displayed independently of the main game. Play of the jackpot game affects at least one of the awarding of a jackpot prize and value of a jackpot prize pool from which the jackpot prize is awarded.

16 Claims, 6 Drawing Sheets

(56) References Cited

U.S. PATENT DOCUMENTS

| | | | | |
|---|---|---|---|---|
| 6,896,260 | B2 | 5/2005 | Pierce | |
| 7,384,337 | B2 * | 6/2008 | Thomas | G07F 17/32 463/27 |
| 8,092,302 | B2 * | 1/2012 | Cuddy et al. | 463/27 |
| 8,460,083 | B2 * | 6/2013 | Joshi et al. | 463/20 |
| 2001/0036857 | A1 * | 11/2001 | Mothwurf et al. | 463/25 |
| 2001/0054794 | A1 * | 12/2001 | Cole et al. | 273/138.1 |
| 2003/0064806 | A1 | 4/2003 | Gordon et al. | |
| 2004/0072613 | A1 | 4/2004 | Visocnik | |
| 2004/0072618 | A1 | 4/2004 | Bartholomew et al. | |
| 2004/0073887 | A1 | 4/2004 | Leymann et al. | |
| 2005/0159207 | A1 * | 7/2005 | Thomas | 463/20 |
| 2006/0003829 | A1 | 1/2006 | Thomas | |
| 2006/0025203 | A1 | 2/2006 | Thomas | |
| 2006/0189377 | A1 * | 8/2006 | Gomez | G07F 17/3244 463/20 |
| 2007/0026941 | A1 * | 2/2007 | Block et al. | 463/29 |
| 2007/0060319 | A1 * | 3/2007 | Block et al. | 463/27 |
| 2007/0207847 | A1 * | 9/2007 | Thomas | 463/17 |
| 2007/0218982 | A1 * | 9/2007 | Baerlocher | 463/27 |
| 2008/0113727 | A1 * | 5/2008 | Vallejo et al. | 463/17 |

* cited by examiner

SYSTEM AND METHOD FOR GAMING

RELATED APPLICATIONS

This application is a continuation of U.S. patent application Ser. No. 12/367,130, having a filing date of Feb. 6, 2009, which claims priority to Australian Provisional Patent Application No. 2008900547, having a filing date of Feb. 6, 2008, which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

The present invention relates to a gaming system, a method of gaming, a game controller and computer program code.

BACKGROUND OF THE INVENTION

It is known to provide a gaming system which comprises a game controller arranged to randomly display several symbols from a predetermined set of symbols and to determine a game outcome such as a game win based on the displayed symbols. Such gaming systems may commonly be implemented as a stepper machine provided with reels with each reel carrying several symbols of the set, or a video machine wherein selected symbols are displayed on virtual reels on a video display.

It is also known to provide a "jackpot" prize which is linked to the gaming system. The jackpot prize may be awarded in one or more ways. For example, by awarding the jackpot prize at random time intervals, the player is provided with an incentive to continue playing, as the player believes that, as time passes, the probability of the jackpot prize being awarded increases. The player is therefore more likely to continue playing.

In another example, the jackpot prize may be awarded when a special symbol (or combination of symbols) appears on the gaming machine. Once again, as time passes, the player believes that the probability of a suitable symbol combination appearing will increase, which acts as an incentive for the player to continue to play.

BRIEF SUMMARY OF THE INVENTION

In a first aspect, the invention provides a method of gaming comprising providing a jackpot game in addition to a main game, the jackpot game being displayed independently of the main game, wherein play of the jackpot game affects at least one of the awarding of a jackpot prize and value of a jackpot prize pool from which the jackpot prize is awarded.

In an embodiment the jackpot game operates independently of the main game. It will be understood that, in the context of the present specification, the phrase "operates independently" is used to indicate that play of the jackpot game is in not influenced by or otherwise tied to an outcome of the main game.

In an embodiment, the jackpot game is played with a plurality of symbols. In one embodiment, the symbols may be provided on a reel suitable for use in a gaming machine. However, it will be understood that the plurality of symbols may also be represented as a deck of cards, a dice, or any other object that is associated with (or capable of displaying) a plurality of symbols.

The plurality of symbols may include a plurality of entitlement symbols arranged to, on selection, trigger the jackpot game to provide the player with a chance to win the jackpot prize. In an embodiment, the trigger causes an additional game to be played, the outcome of the additional game determining whether the jackpot prize is to be awarded to the player.

Additionally or alternatively, the plurality of symbols may include a plurality of increment symbols arranged to, on selection, increment the value of the jackpot prize pool.

The plurality of entitlement symbols may include at least two sub-sets of symbols, each sub-set being associated with a different jackpot prize.

The jackpot prize may be incremented by the product of a bet amount selected during the main game and the value of the increment symbol.

The number of entitlement symbols and/or the probability of the player winning the jackpot prize may be a function of a bet amount wagered in the main game.

In an embodiment the symbols are provided on a reel. Where the main game is a reel-type game, for example, the symbols may be displayed on a supplementary reel.

In a second aspect, the invention provides a game controller for a gaming system, the game controller arranged to provide a jackpot game in addition to a main game, the jackpot game being displayed independently of the main game, wherein play of the jackpot game affects at least one of the awarding of a jackpot prize and value of a jackpot prize pool from which the jackpot prize is awarded.

In an embodiment the jackpot game operates independently of the main game.

In an embodiment the jackpot game is played utilising a plurality of symbols.

In an embodiment the game controller further comprises a symbol selector module arranged to select at least one of the symbols for determining an outcome of the jackpot game.

In an embodiment the plurality of symbols includes at least one entitlement symbol arranged to, on selection by the symbol selector module, trigger an additional game to provide a player with a chance to win the jackpot prize.

In an embodiment the plurality of symbols includes at least one increment symbol arranged to, on selection by the symbol selector module, increment the value of the jackpot prize pool.

In an embodiment the game controller further comprises a display module arranged to display the plurality of symbols on a reel.

In a third aspect, the invention provides a gaming system comprising

- a gaming device; and
- a game controller arranged to provide a jackpot game in addition to a main game on the gaming device, the jackpot game displayed independently of the main game,
- wherein play of the jackpot game affects at least one of the awarding of a jackpot prize and value of a jackpot prize pool from which the jackpot prize is awarded.

In a fourth aspect the present invention provides a method of gaming comprising:

- providing a jackpot game in addition to a main game, the additional game operating independently of the main game,
- wherein the jackpot game triggers an additional game which determines whether the jackpot is won.

In a fifth aspect, the invention provides computer program code which when executed by a processor implements a method in accordance with the first or fourth aspects of the invention.

In a sixth aspect the invention provides a computer readable medium comprising the program code in accordance with a fifth aspect of the invention.

BRIEF DESCRIPTION OF SEVERAL VIEWS OF THE DRAWINGS

An embodiment of the invention will now be described in relation to the following drawings in which.

DETAILED DESCRIPTION OF THE INVENTION

In an embodiment there is provided a game controller arranged to provide a jackpot game in addition to a main game. The jackpot game is displayed independently of the main game and play of the jackpot game affects at least one of the awarding of a jackpot prize and value of a jackpot prize pool from which the jackpot prize is awarded. The jackpot game may, for example, be in the form of a "jackpot reel" which carries a plurality of symbols. On selection, the symbols may cause either the jackpot prize pool to be incremented or jackpot prize be determined.

The gaming system may be provided in a number of different forms.

In a first form, a stand alone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Figure 1:
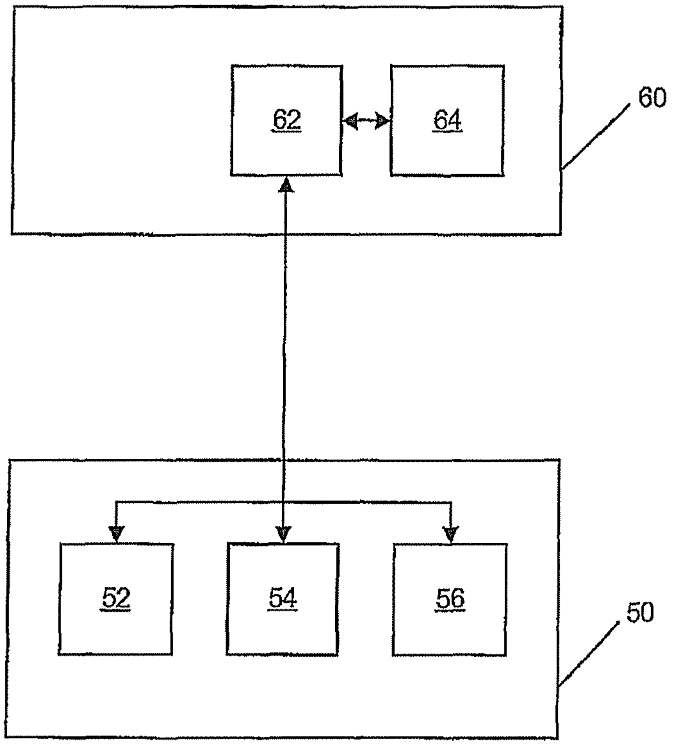
FIG. 1 is a block diagram of the core components of a gaming system.

Irrespective of the form, the gaming system comprises several core components. At the broadest level, the core components are a player interface 50 and a game controller 60 as illustrated in FIG. 1. The player interface is arranged to enable manual interaction between a player and the gaming system and for this purpose includes the input/output components required for the player to enter instructions and play the game.

Components of the player interface may vary from embodiment to embodiment but will typically include a credit mechanism 52 to enable a player to input credits and receive payouts, one or more displays 54 and a game play mechanism 56 that enables a player to input game play instructions.

The game controller 60 is in data communication with the player interface and typically includes a processor 62 that processes the game play instructions in accordance with game play rules and outputs game play outcomes to the display. Typically, the game play instructions are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

Figure 2:
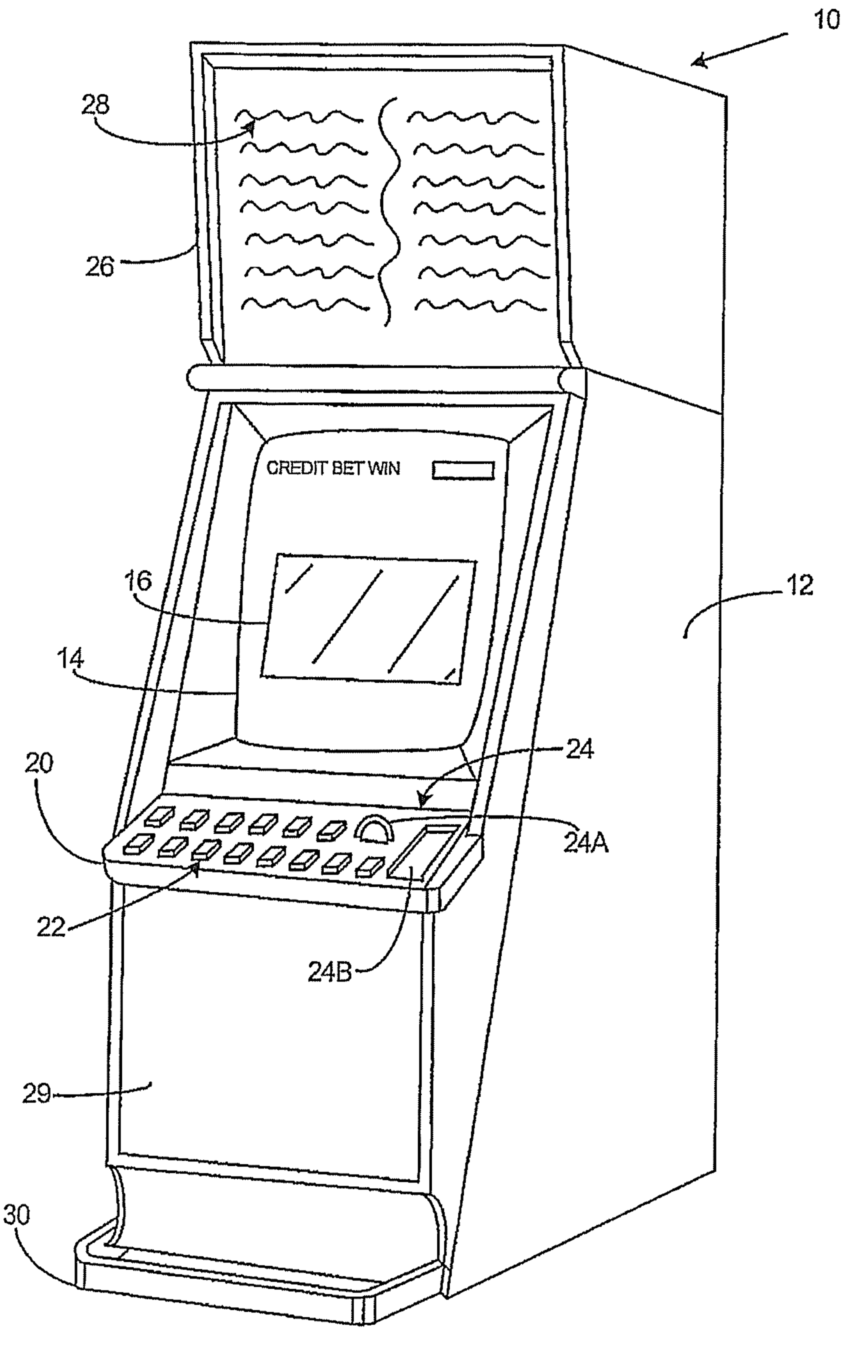
FIG. 2 is a perspective view of a gaming machine.

A gaming system in the form of a stand alone gaming machine 10 is illustrated in FIG. 2. The gaming machine 10 includes a console 12 having a display 14 on which is displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. A player marketing module may be provided having a reading device may also be provided for the purpose of reading a player tracking device, for example as part of a loyalty program. The player tracking device may be in the form of a card, flash drive or any other portable storage medium capable of being read by the reading device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
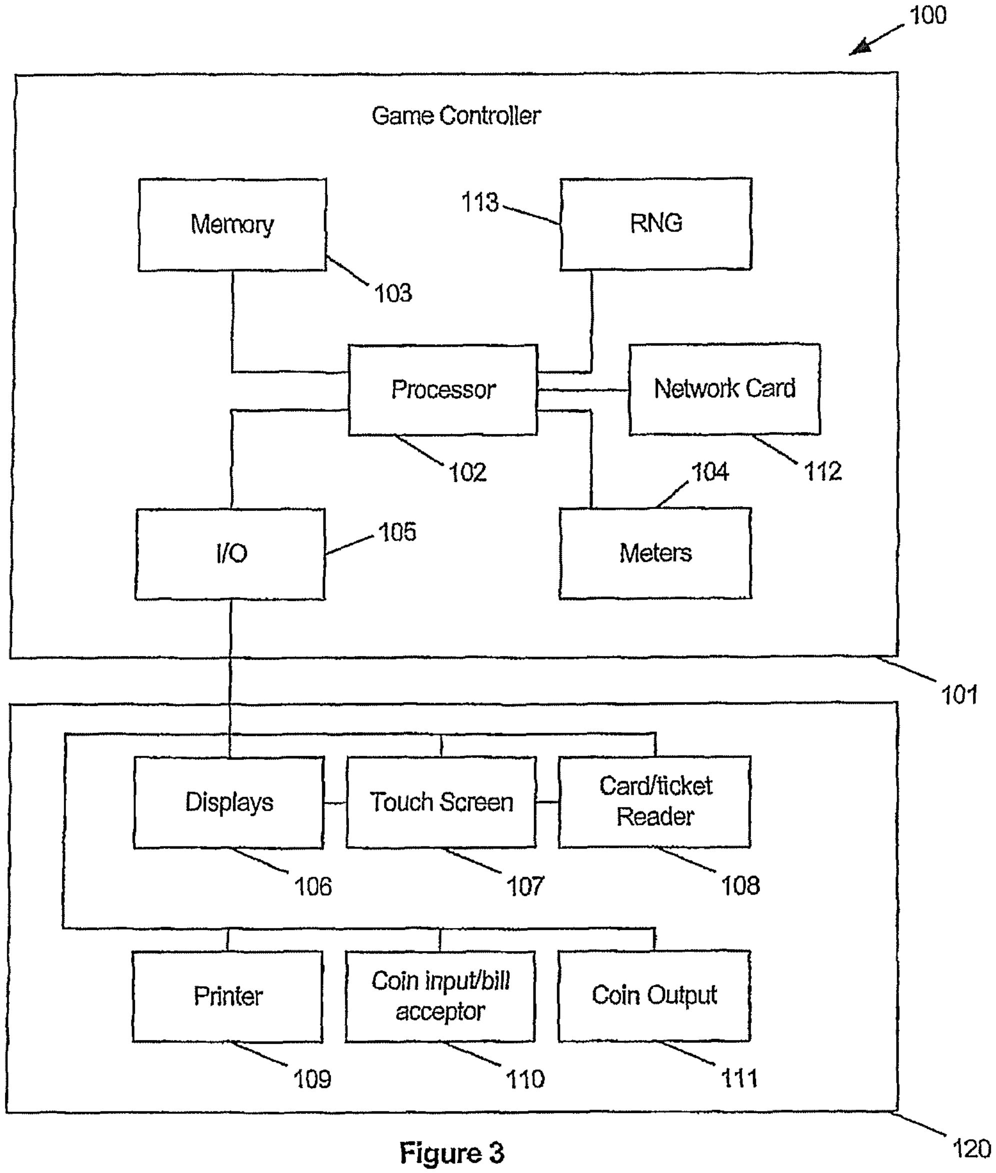
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 comprise one or more displays 106, a touch screen and/or buttons 107, a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation.

In addition, the gaming machine 100 may include a communications interface, for example a network card 112. The network card may, for example, send status information, accounting information or other information to a central controller, server or database and receive data or commands from the central controller, server or database.

Figure 4:
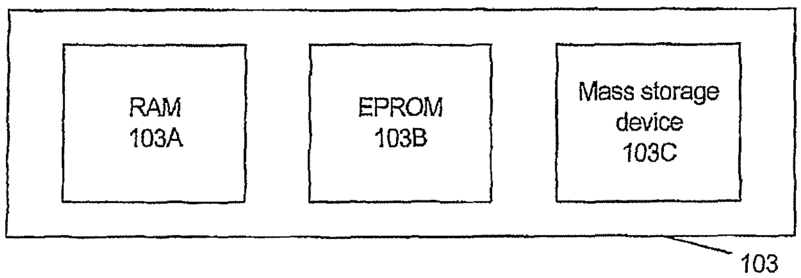
FIG. 4 is a block diagram representing the structure of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
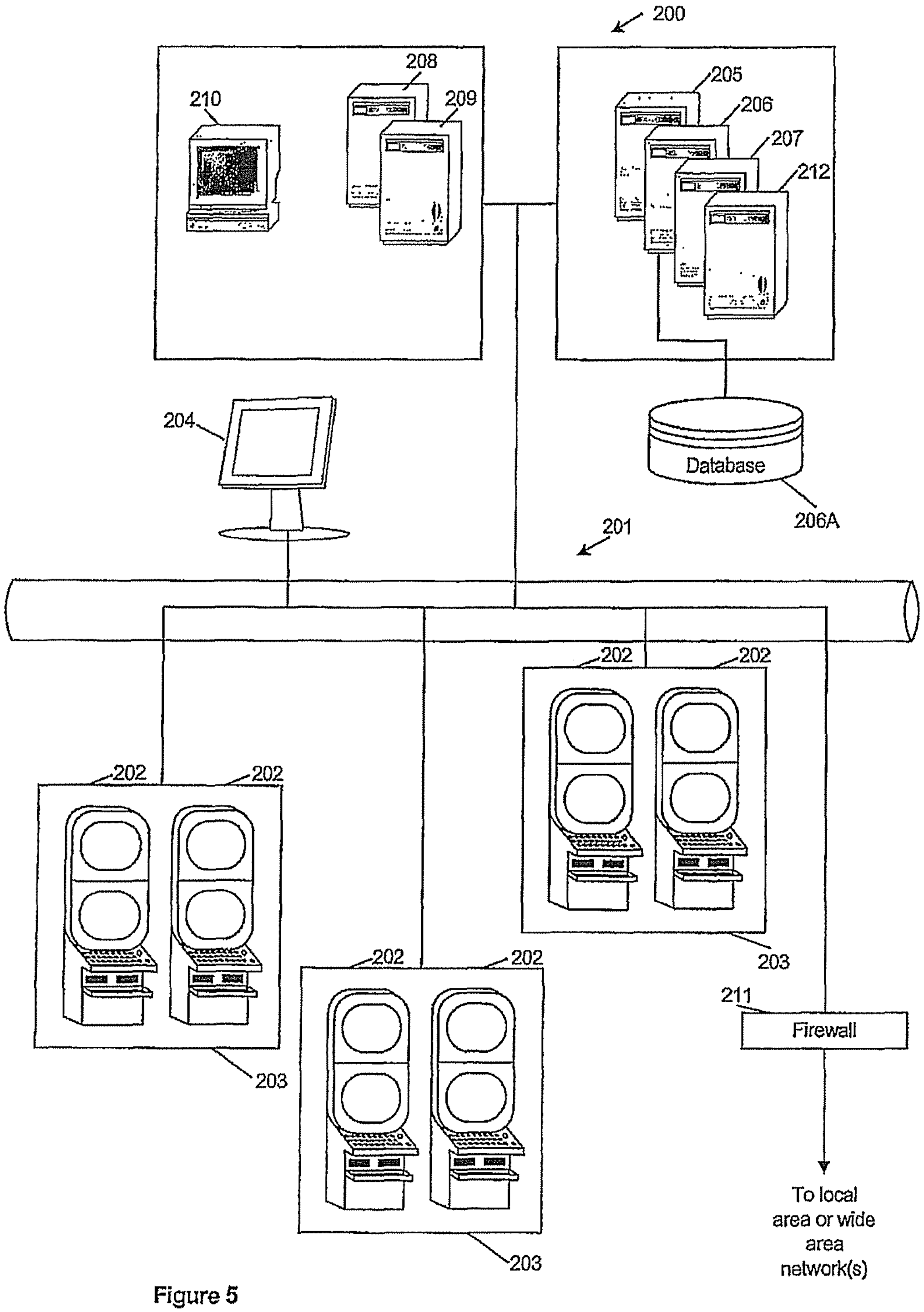
FIG. 5 is a diagram schematic of a networked gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. The displays 204 may, for example, be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to carry out the accounting in respect of the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming network 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of games servers could be provided to run different games or a single game server may run a plurality of different games as required by the terminals.

In some implementations the game controllers of such gaming machines select symbols by employing a stop determining function that randomly determines the stop position for each reel. For example, if there are five reels, each having twenty symbols, the stop determining function might determine that the stop positions are positions: 3, 13, 7, 9 and 17. The spinning of the reels is then controlled so that each symbol comes to a stop in the same row, typically a predetermined row in a "window" visible to the player on the display that which corresponds to a player playing a single win line. When a reel stops, the symbols will be in one of a plurality of possible symbol positions for that reel relative to the stop position.

Spinning reel type games typically allow a player to select how many win lines of a plurality of win lines they will play in each game—i.e. a minimum of one win line up to the maximum number of win lines allowed by the game. Persons, skilled in the art, will appreciate that in other embodiments, the player may select a number of reels to play. Each win line is formed by a set of symbol positions consisting of one symbol position from each reel. That is, a predetermined symbol position of each reel is assigned to a win line. The symbol positions that constitute each of the win lines are usually advertised to the player by markings on the display or diagrams showing the symbol positions that correspond to each win line. Some of the win lines will be horizontal or diagonal lines but others may be more complex combinations of symbols. Typically, the win lines will be constituted by symbol positions in the visible window. A game outcome is determined based on the symbols on the win lines and a prize table that specifies awards.

Further Detail of Game Controller

Figure 6:
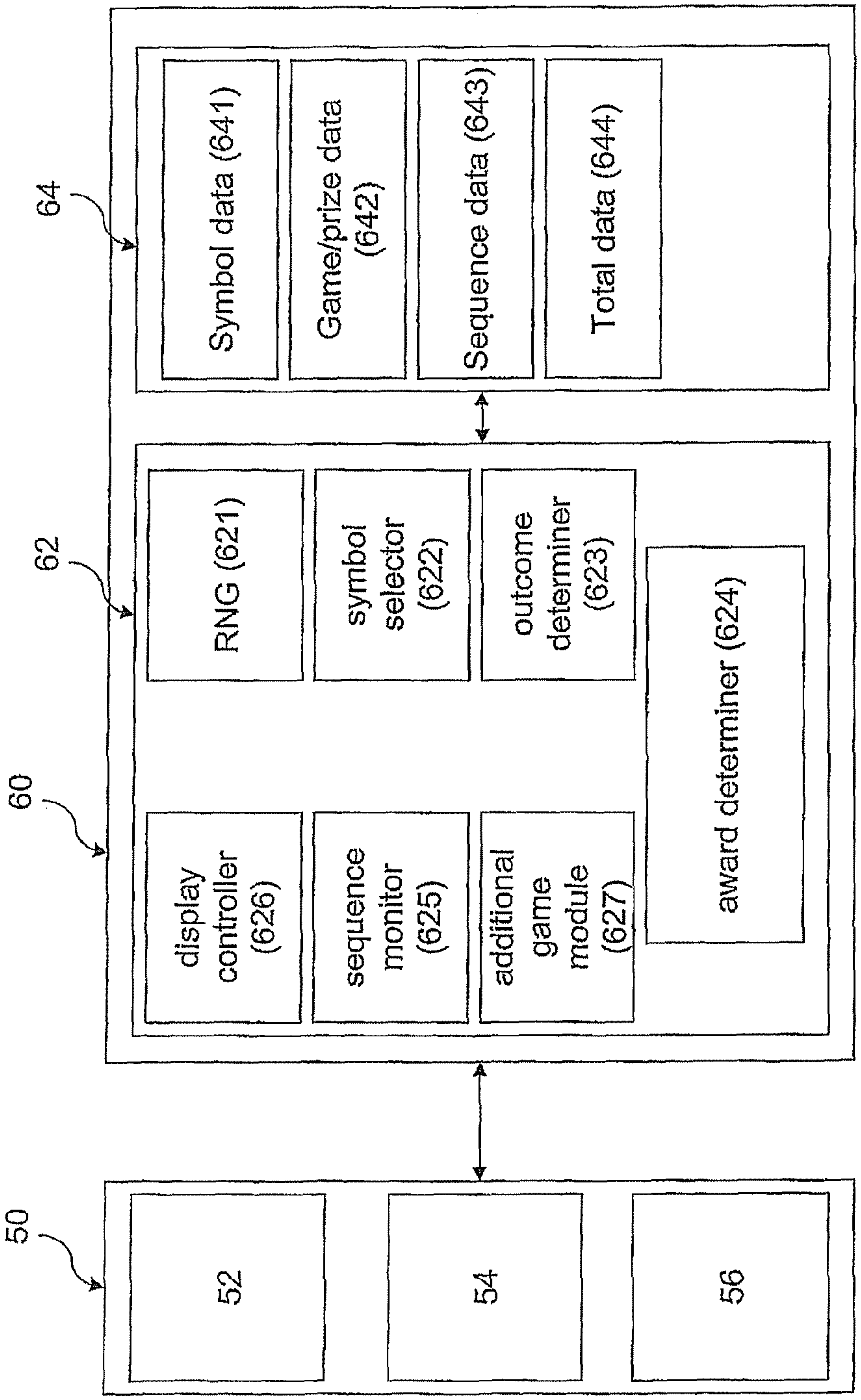
FIG. 6 is a further block diagram of the gaming system.

The game controller 60 according to an embodiment of the present invention is shown in more detail in FIG. 6. It will be apparent that the processor 62 implements a number of modules, namely random number generator module 621, symbol selector module 622, outcome determiner module 623, award determiner module 624, sequence monitoring module 625, and display controller module 626, based on data stored in memory 64. Persons skilled in the art will appreciate that not all modules need be implemented by processor 62. For example, the random number generator module 621 could be implemented by a separate circuit or by a random number generator server.

In the preferred embodiment, the game controller is arranged to control play of both a main game in the form of a standard reel-type game and a "jackpot game" displayed independently of the main game.

During each game of the main reel game, the symbol selector 622 selects symbols to appear in a reel window displaying five reels, based on symbol data 641 which specifies the available symbols. The symbols to appear in the reel window are selected by the symbol selector 622 using a random number obtained from the random number generator 621. The outcome determiner module 623 determines the game outcomes and their associated prizes based on the number of win lines the player is playing and the symbol combinations. Persons skilled in the art will also appreciate that the game outcomes and their associated prizes are displayed on the display 54 or under control of the display controller 626.

An award determiner 624 is employed to keep track of the total award and subsequently to modify that award as more games are played. The total is maintained as total data 644 in memory 64. Thus, after each game the award determiner 624 updates the total data 644 to reflect the current total. The sequence monitor 625 monitors for completion of the sequence and, at the conclusion of the sequence, instructs the award determiner 624 to modify the accumulated total.

The game controller 60 also comprises an additional game module 627 which is arranged to implement the jackpot game. One embodiment may be implemented as a "jackpot reel", which is provided in addition to the conventional reels displayed in the main game.

That is, an additional reel, hereinafter referred to as the "sixth reel" (due to the embodiment having a main reel game including five reels) is provided in addition to the main reel game of a gaming machine. In the embodiment, the sixth reel is displayed alongside the five reels of the main reel game. However, it will be understood that the sixth reel may be displayed in any suitable location, such as, for example, on a video screen above the main reel game. Moreover, the sixth reel may be displayed in any suitable configuration, such as a "vertical" reel, a "horizontal" reel, or as a "wheel".

In another embodiment, the sixth wheel may be physically separate from the gaming machine (e.g. the sixth wheel may be implemented as a roulette-style wheel which is located adjacent to, but not incorporated into, the gaming machine). Such variations are within the purview of a person skilled in the art.

Figure 7:
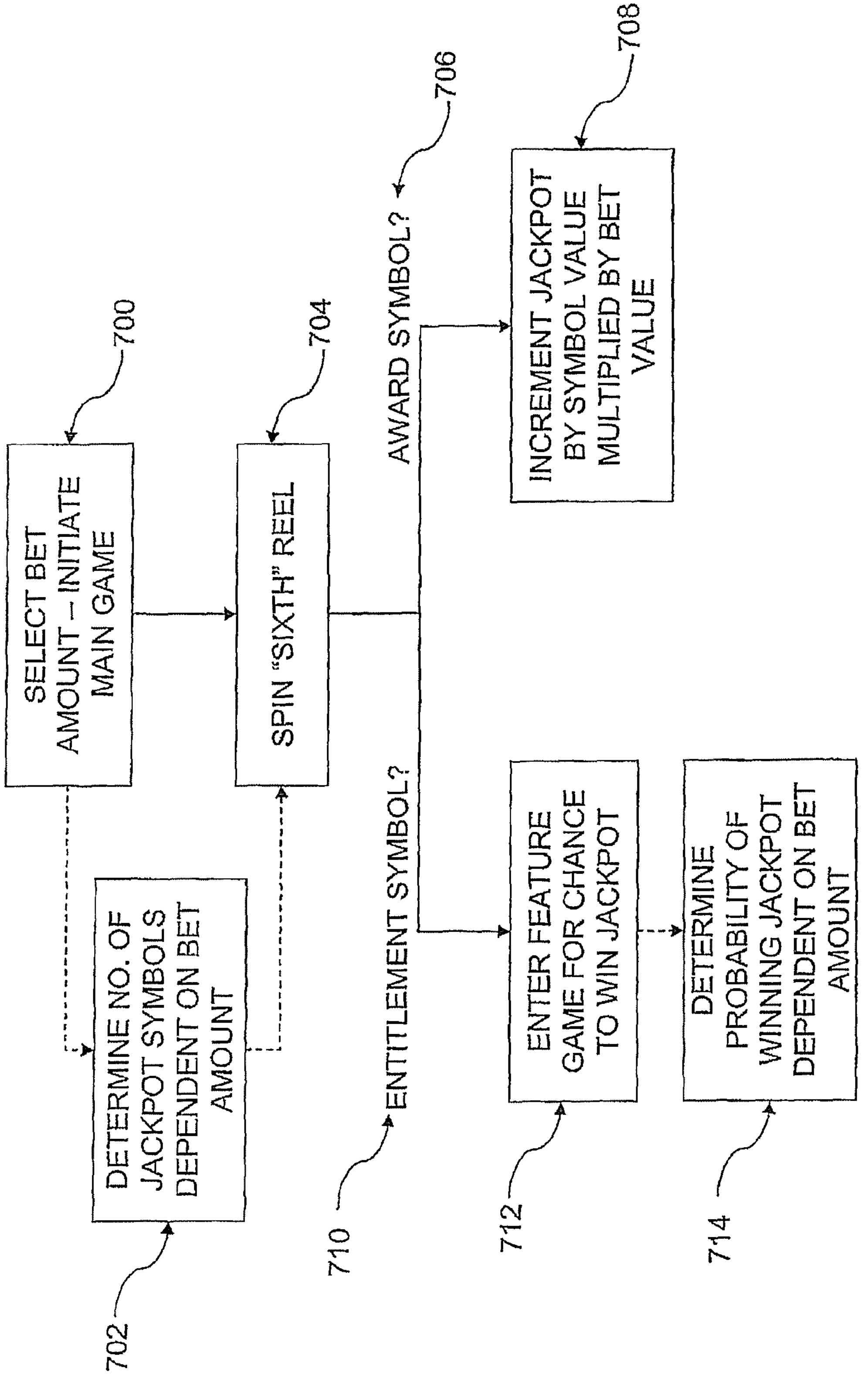
FIG. 7 is a flowchart of a preferred embodiment.

In the embodiment described with reference to FIG. 7, the sixth reel includes a set of symbols that either have an affect on the awarding of a jackpot prize or the jackpot prize pool value. In the illustrated embodiment, there are a plurality of different jackpot prizes on offer, each associated with a different jackpot prize value. That is, a number of different jackpots may effectively be provided, such as a "mini" jackpot, a "midi" jackpot and a "major" jackpot.

For example, according to one implementation, there may be five different jackpot prizes on offer in the jackpot game. The set of symbols provided on the sixth reel, in the illustrated embodiment being in the form of four different type of characters, is associated with one of the following symbol functions:

1. Symbols that award an increment to the jackpot prize pool;
2. Symbols that award one of the five jackpots on offer;
3. Symbols that award an entitlement to an additional or supplementary game, providing the player with a chance to win one or more of the five jackpots; and
4. Symbols that have no value (i.e. no increment or entitlement is awarded).

It will be understood that the sixth reel may include any combination of the four types of symbols described above. Moreover, the sixth reel may also include other symbols not related to the jackpot. For example, the sixth reel may include symbols which provide other rewards/prizes not connected to the jackpot. Such variations are within the purview of a person skilled in the art.

The operation of the sixth reel is described with reference to the flowchart of FIG. 7. The sixth reel operates independently of the main reel game. That is, the sixth reel is a separate game which is not influenced by the outcome of the main reel game. As such, it can be added to existing main reel games without needing to change the probabilities (programming) of the main reel game.

However, while the decision to "spin" the sixth reel is not influenced by the outcome of the main reel game, the sixth reel is invoked (at step 700) when a player initiates the main reel game. While the sixth reel is spun for every game (in the embodiment described herein), it will be understood that the sixth reel may be arranged to only spin as required. For example, the sixth reel may only spin at random times, or in response to a game outcome in the main reel game.

Optionally, the number of jackpot entitlement symbols available on the sixth reel may be determined by the amount bet by the player in the main reel game (step 702).

Either in conjunction with, or at the conclusion of, the main reel game, the sixth reel is spun (step 704) and an outcome is determined.

If the sixth reel displays a jackpot increment symbol on the centre position (step 706), then the corresponding jackpot is incremented by the symbol value multiplied by the bet placed by the player during the main game (step 708).

Alternatively, if the sixth reel displays an entitlement symbol on the centre position (step 710), then a jackpot feature (e.g. an additional game) is invoked (step 712) on the main reel game, which provides the player with a chance to win the jackpot. That is, a further main reel game may be invoked when an entitlement symbol on the centre position.

The main reel game may be a "feature game", which is an additional game invoked on the main reels. The feature game operates in a manner analogous to a standard main reel game, but each reel may include additional jackpot symbols, such that, if the correct sequence of jackpot symbols are displayed, the player wins the jackpot.

Optionally, the probability of winning the jackpot may be a function of the bet placed by the player during the main reel game (step 714). That is, the higher the bet placed by the player, the higher the probability of winning a jackpot prize. In one example implementation, the probability may be increased by increasing the number of jackpot symbols available during the feature game. By increasing the number of available jackpot symbols, the probability of a player receiving the correct number/combination of jackpot symbols is correspondingly increased. Of course, it will be understood that any suitable technique or formula may be utilised to increase the probability of a player winning the jackpot. Various techniques would be known to a person skilled in the art.

It will be understood that step 702 (determining the number of jackpot symbols on the sixth reel as function of the initial bet) and step 714 (determining the probability of winning the jackpot as a function of the initial bet) may be used separately or in conjunction, depending on the incentive mechanism desired by the person skilled in the art. Such variations are within the purview of a person skilled in the art.

Many gaming systems, such as the exemplary gaming system described herein, implement games that involve a display of spinning reels as part of the display of the outcome of a game. However, persons skilled in the art will appreciate that the invention broadly described herein can be implemented in respect of other forms of games, including card games, ball draw games (e.g. bingo or keno), dice games, and pin and ball games.

For example, rather than providing a reel with a number of symbols, a "deck of cards" may be provided, such that each card is associated with a particular award (i.e. some cards award an entitlement to an additional or supplementary game, whereas other cards award an increment to the jackpot). A person skilled in the art would understand that such a concept may also be easily extended to dice games, numbered ball games, or indeed any type of game of chance where markers with different values/symbols are utilised.

The invention claimed is:

1. A method of operating a gaming machine having slot machine reels configured to display a main game and a separate jackpot reel comprising a plurality of different symbols, the method comprising:

receiving, via a credit input mechanism, an item associated with a monetary value, and establishing a credit balance based on the monetary value;

receiving an amount bet funded from the credit balance to play the gaming machine;

initiating play of a main game of the gaming machine;

determining a number of entitlement symbols for the jackpot reel based on the amount bet;

spinning the jackpot reel to obtain a jackpot game outcome;

awarding a feature game in response to the jackpot game outcome comprising an entitlement symbol;

adjusting a probability of the feature game awarding a jackpot prize determining, based on the amount bet, a number of jackpot symbols available during the feature game;

initiating play of the feature game of the gaming machine after adjusting the probability; and awarding the jackpot prize from a jackpot pool in response to obtaining an winning outcome from play of the jackpot feature game comprising a winning combination of jackpot symbols, wherein any awarded prize is added to the credit balance.

2. The method of claim 1, wherein said adjusting comprises adjusting the probability such that a higher amount bet results in a higher probability of winning the jackpot prize.

3. The method of claim 1, wherein:

the plurality of different symbols of the jackpot reel includes one or more jackpot symbols associated with the jackpot prize; and the method further comprises awarding the jackpot prize in response to the jackpot game outcome comprising a jackpot symbol associated with the jackpot prize.

4. The method of claim 1, wherein:

said initiating play of the main game comprises spinning a plurality of reels for the main game; and the jackpot reel is distinct from the plurality of reels for the main game.

5. The method of claim 1, wherein:

the plurality of different symbols of the jackpot reel include a plurality of different jackpot symbols, each different jackpot symbol associated with a different jackpot prize; and the method further comprises awarding the jackpot prize in response to the jackpot game outcome comprising a jackpot symbol associated with the jackpot prize.

6. The method of claim 5, further comprising awarding another jackpot prize in response the jackpot game outcome comprising another jackpot symbol associated with the another jackpot prize.

7. The method of claim 1, wherein:

the plurality of different symbols of the jackpot reel include a plurality of jackpot symbols and a plurality of jackpot increment symbols; and the method further comprises:

awarding the jackpot prize in response to the jackpot game outcome comprising a jackpot symbol associated with the jackpot prize; and incrementing the jackpot prize in response to the jackpot game outcome comprising a jackpot increment symbol associated with the jackpot prize.

8. A non-transitory computer readable storage medium comprising a plurality of instructions stored thereon, wherein the plurality of instructions, in response to being executed, result in a game controller:

in response to a credit input mechanism receiving an item associated with a monetary value, establishing a credit balance based on the monetary value;

receiving an amount bet funded from the credit balance to play a gaming machine comprising slot machine reels configured to display a main game and a separate jackpot reel having a plurality of different symbols;

initiating play of a main game of the gaming machine;

determining a number of entitlement symbols for the jackpot reel based on the amount bet;

spinning the jackpot reel to obtain an jackpot game outcome;

awarding a feature game in response to the jackpot game outcome comprising an entitlement symbol;

adjusting a probability of the feature awarding a jackpot prize determining, based on the amount bet, a number of jackpot symbols available during the feature game;

initiating play of the feature game of the gaming machine after adjusting the probability; and awarding the jackpot prize from a jackpot pool in response to obtaining an outcome from play of the feature game comprising a winning combination of jackpot symbols, wherein any awarded prize is added to the credit balance.

9. The non-transitory computer readable storage medium of claim 8, wherein the plurality of instructions further result in the game controller adjusting the probability such that a higher amount bet results in a higher probability of winning the jackpot prize.

10. The non-transitory computer readable storage medium of claim 8, wherein:

the plurality of different symbols of the jackpot reel includes one or more jackpot symbols associated with the jackpot prize; and the plurality of instructions further result in the game controller awarding the jackpot prize in response to the jackpot game outcome comprising a jackpot symbol associated with the jackpot prize.

11. The non-transitory computer readable storage medium of claim 8, wherein:

the plurality of different symbols of jackpot reel include a plurality of jackpot symbols and a plurality of jackpot increment symbols;

the plurality of instructions further result in the game controller:

awarding the jackpot prize in response to the jackpot game outcome comprising a jackpot symbol associated with the jackpot prize; and incrementing the jackpot prize in response to the jackpot game outcome comprising a jackpot increment symbol associated with the jackpot prize.

12. A gaming machine, comprising:

a plurality of reels associated with a main game;

a separate jackpot reel associated with a jackpot game, the jackpot reel comprising a plurality of different symbols; and a game controller configured to:

receive, via a credit input mechanism, an item associated with a monetary value, and establish a credit balance based on the monetary value;

receive an amount bet funded from the credit balance;

determine a number of entitlement symbols for the jackpot reel based on the amount bet;

spin the plurality of reels to obtain a main game outcome;

spin the jackpot reel to obtain a jackpot game outcome;

award a feature game in response to the jackpot game outcome comprising an entitlement symbol;

adjust a probability of the feature game awarding a jackpot prize by determining, based on the amount bet, a number of jackpot symbols available during the feature game;

initiate play of the feature game after adjusting the probability; and award the jackpot prize from a jackpot pool based on an outcome of the feature game comprising a winning combination of jackpot symbols, wherein any awarded prize is added to the credit balance.

13. The gaming machine of claim 12, wherein the game controller is further configured to adjust the probability such that a higher amount bet results in a higher probability of winning the jackpot prize.

14. The gaming machine of claim 12, wherein:

the plurality of different symbols of the jackpot reel includes one or more jackpot symbols associated with the jackpot prize; and the game controller is further configured to award the jackpot prize in response to the jackpot game outcome comprising a jackpot symbol associated with the jackpot prize.

15. The gaming machine of claim 12, wherein:

the plurality of different symbols of the jackpot reel includes a plurality of jackpot increment symbols; and the game controller is further configured to increment the jackpot prize in response to the jackpot game outcome comprising a jackpot increment symbol associated with the jackpot prize.

16. The gaming machine of claim 12, wherein:

the jackpot reel comprises a plurality of different jackpot symbols, each different jackpot symbol associated with a different jackpot prize of a plurality of jackpot prizes; and the game controller is further configured to award a particular jackpot prize of the plurality of jackpot prizes in response to a jackpot game outcome comprising a jackpot symbol associated with the particular jackpot prize.

* * * * *